United States Patent
Aiello (10) Patent No.: US 7,200,716 B1
(45) Date of Patent: Apr. 3, 2007

(54) METHOD AND APPARATUS TO OFFLOAD OPERATIONS IN A NETWORKED STORAGE SYSTEM

(75) Inventor: Anthony F. Aiello, Santa Clara, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 307 days.

(21) Appl. No.: 10/837,002

(22) Filed: Apr. 30, 2004

(51) Int. Cl.
*G06F 12/00* (2006.01)

(52) U.S. Cl. ...................... 711/114; 709/226
(58) Field of Classification Search ................. 711/114
See application file for complete search history.

(56) References Cited

U.S. PATENT DOCUMENTS

| | | | | |
|---|---|---|---|---|
| 5,530,948 | A * | 6/1996 | Islam | 714/6 |
| 6,810,462 | B2 * | 10/2004 | Matsunami et al. | 711/112 |
| 2003/0158998 | A1 * | 8/2003 | Smith | 711/112 |
| 2003/0196023 | A1 * | 10/2003 | Dickson | 711/1 |
| 2003/0233502 | A1 * | 12/2003 | Murotani et al. | 710/74 |
| 2005/0097271 | A1 * | 5/2005 | Davies et al. | 711/114 |
| 2005/0246345 | A1 * | 11/2005 | Lent et al. | 707/10 |

* cited by examiner

*Primary Examiner*—Brian R. Peugh
*Assistant Examiner*—Hashem Farrokh
(74) *Attorney, Agent, or Firm*—Blakely Sokoloff Taylor & Zafman, LLP (57) ABSTRACT

A method and apparatus to offload operations has been disclosed. In one embodiment, the method includes configuring a number of storage devices in a networked storage system according to a redundancy scheme using a storage server in the networked storage system, providing information on a configuration of the storage devices from the storage server to an offload engine coupled to the storage server, and the storage server directing the offload engine to perform operations on the storage devices, wherein the storage devices are presented transparently to the storage server via the offload engine. Other embodiments are described and claimed.

17 Claims, 7 Drawing Sheets

METHOD AND APPARATUS TO OFFLOAD OPERATIONS IN A NETWORKED STORAGE SYSTEM

FIELD OF INVENTION

The present invention relates to networked storage systems, and more particularly, to offloading operations in a networked storage system.

BACKGROUND

A networked storage system may include a number of network storage servers, which may be implemented in the form of storage appliances. A storage server may provide file services related to the organization of data on storage devices, such as disks. Such a storage server is commonly referred to as a file server or a filer. An example of such a storage server is any of the filer products made by Network Appliance, Inc. in Sunnyvale, Calif. The storage server may be implemented with a special-purpose computer or a general-purpose computer. The storage server is typically coupled to a number of storage devices, such as disks, to store or to retrieve data on the storage devices. The disks may be arranged into Redundant Array of Independent Disks (RAID) volumes.

A typical RAID volume includes a number of data disks and a parity disk. Each of the data disks and the parity disk is divided into a number of stripes. Data is stored in the stripes of the data disks, which are typically independent of each other. A parity bit is determined for each stripe across a number of disks. For example, each of a set of disks may have four stripes. A conventional RAID controller, which may be implemented in a storage server, may determine a parity bit of the first stripe of each disk by performing an exclusive-OR (XOR) operation on the data in the first stripe of each disk. The parity bit of each stripe is usually stored in the corresponding stripe of the parity disk.

However, the operations involved in determining the parity bit are usually memory intensive, and thus, consume substantial valuable processing resources in the RAID controller. In addition to parity determination, the RAID controller typically performs input/output (I/O) operations to the storage devices, determines where to store data on the storage devices and when to store the data on the storage devices.

SUMMARY

The present invention includes a method and apparatus to offload operations from a storage server in a networked storage system. In one embodiment, the method includes configuring a number of storage devices in a networked storage system according to a redundancy scheme using a storage server in the networked storage system, providing information on a configuration of the storage devices from the storage server to an offload engine coupled to the storage server, and the storage server directing the offload engine to perform operations on the storage devices, wherein the storage devices are presented transparently to the storage server via the offload engine.

In specific embodiments of the present invention, the storage devices are configured into Redundant Array of Independent Disks (RAID) volumes.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus to offload operations from a storage server in a networked storage system are described. In the following description, numerous specific details are set forth. However, it is understood that embodiments of the invention may be practiced without these specific details. In other instances, well-known components, structures, and techniques have not been shown in detail in order not to obscure the understanding of this description.

Some portions of the following detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

A "machine-readable medium," as the term is used in this document, includes any mechanism for storing or transmitting information in a form readable by a machine (e.g., a computer). For example, a machine-readable medium includes ROM; RAM; magnetic disk storage media; optical storage media; flash memory devices; electrical, optical, acoustical or other form of propagated signals (e.g., carrier waves, infrared signals, digital signals, etc.); etc.

Figure 1:
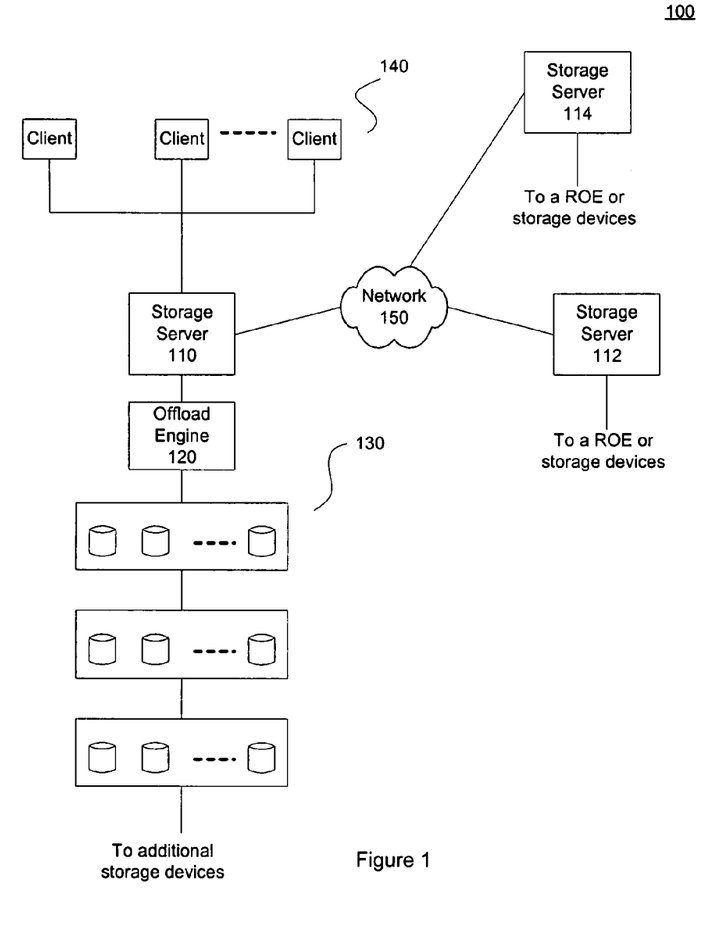
FIG. 1 illustrates an exemplary embodiment of a networked storage system.

FIG. 1 illustrates an exemplary embodiment of a networked storage system 100. The system 100 includes a first storage server 110, a second storage server 112, a third storage server 114, an offload engine 120, a number of client machines 140, a network 150, and a number of storage devices 130.

The system 100 may include a storage area network (SAN), a network-attached storage (NAS) system, or a combination of SAN and NAS. In one embodiment, the SAN transmits read/write requests at the block level between the storage servers 110, 112, and 114. A block is the basic unit used to store data in the SAN. Unlike the SAN, the NAS system transmits data at the file level. In the NAS system, complete files are retrieved instead of segments on a disk. The NAS system uses file access protocols to retrieve data, such as, for example, Network File System (NFS), or Common Internet File System (CIFS). The SAN and the NAS systems may be implemented in a single server or in separate servers.

Note that any or all of the components of system 100 and associated hardware may be used in various embodiments of the present invention. However, it can be appreciated that other configurations of the networked storage system may include some or all of the devices disclosed above.

Referring to FIG. 1, the storage servers 110, 112, and 114 may include file servers. Furthermore, the storage servers 110, 112, and 114 are coupled to each other via the network 150. The network 150 may include a wide area network (WAN), a local area network (LAN), etc. The storage server 110 is also coupled to the client machines 140 and the offload engine 120. The offload engine 120 is further coupled to the storage devices 130, which may include a number of disks arranged in a number of shelves. The disks may include RAID volumes. In one embodiment, the offload engine 120 is coupled to the storage server 110 and the storage devices 130 via Fibre Channel links. The Fibre Channel links may adopt the Internet Small Computer System Interface (iSCSI) protocol for data transfer. Alternatively, the offload engine 120 may be coupled to the storage server 110 and the storage devices 130 via Ethernet connections or other suitable type of connection.

To access the storage devices 130, the storage server 110 offloads predetermined operations to the offload engine 120. The offloaded operations may include memory intensive operations, such as checksum determination (e.g., XOR operations for calculating parity) and I/O operations to and from the storage devices 130. Offloading memory intensive operations to the offload engine 120 saves computing bandwidth of the storage server 110 for other operations. Details of various embodiments of the offload engine 120 and the process to offload operations from the storage server 110 to the offload engine 120 are discussed below.

Figure 4:
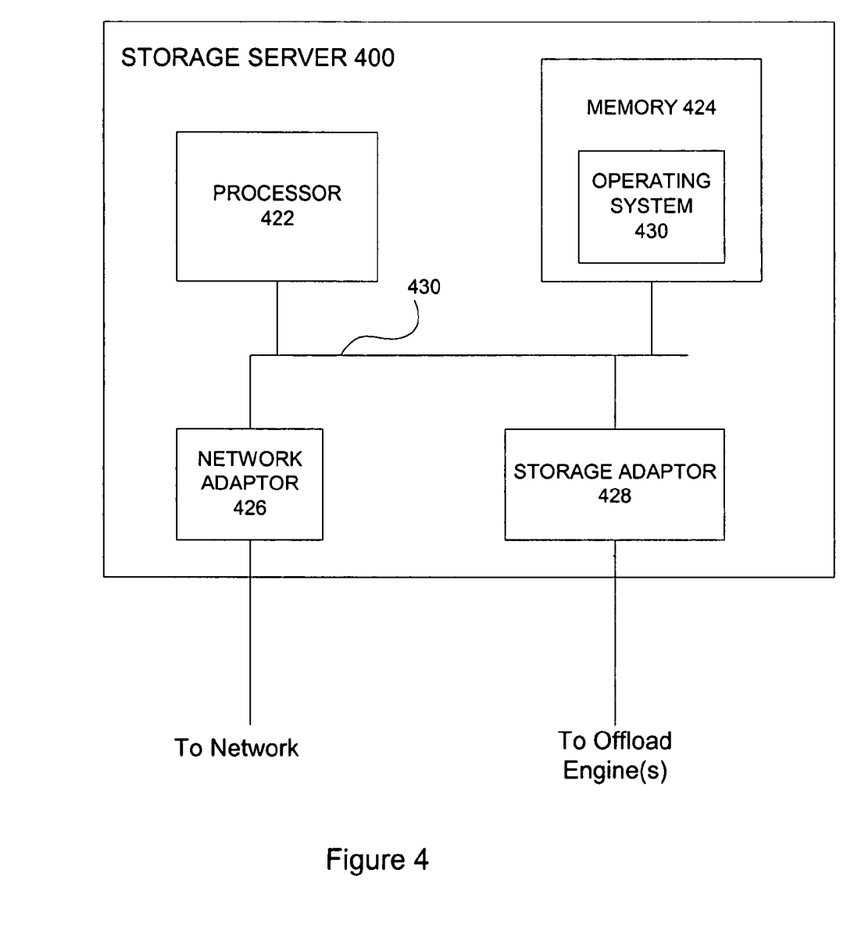
FIG. 4 illustrates one embodiment of a storage server.

Similar to the storage server 110, the storage servers 112 and 114 may each be coupled to storage devices via additional offload engines (not shown). Alternatively, one or both of the storage servers 112 and 114 may be directly coupled to storage devices (not shown) without going through an offload engine. An exemplary embodiment of the storage server 110 is illustrated in FIG. 4.

Figure 2A:
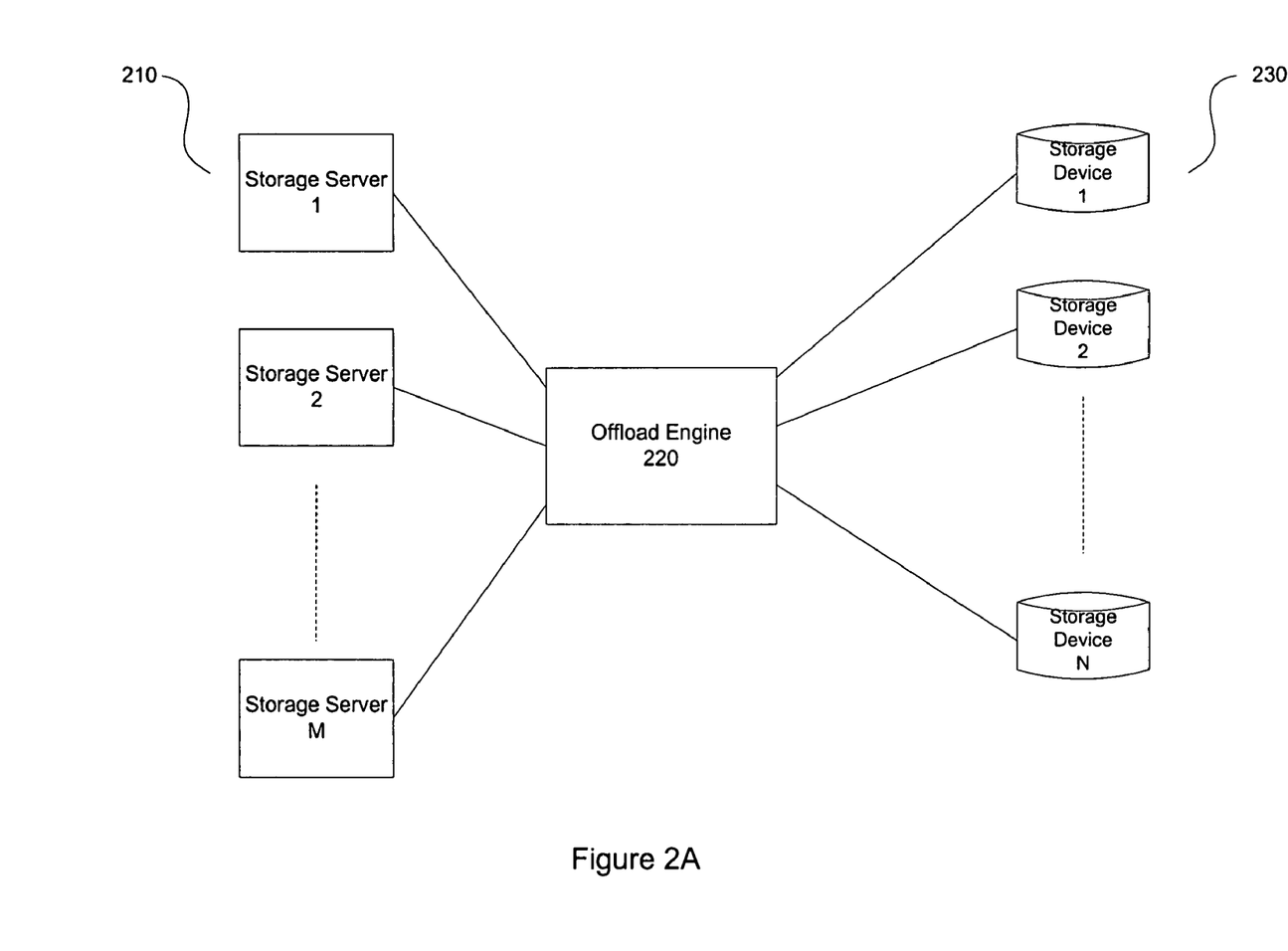
FIG. 2A illustrates one embodiment of a networked storage system.

FIG. 2A illustrates one embodiment of a networked storage system. The system includes a number of storage servers 210, an offload engine 220, and a number of storage devices 230. Each of the storage servers 210 is coupled to the offload engine 220. Likewise, each of the storage devices 230 is coupled to the offload engine 220. The storage devices 230 may include a number of RAID volumes and the offload engine 220 may include a RAID Offload Engine (ROE). Both the storage servers 210 and the storage devices 230 may be coupled to the offload engine 220 via Fibre Channel links.

Referring to FIG. 2A, the storage servers 210 may offload RAID operations to the offload engine 220 by sending directions or requests to the offload engine 220 to cause the offload engine 220 to perform the RAID operations. Examples of the offloaded RAID operations include checksum determination and I/O operations. Moreover, the checksum determination may include parity calculation, and an example of which is discussed in detail below.

In one embodiment, the storage devices 230 include a number of data disks and parity disks. Parity disks store the sum of the XOR of data disks in a predetermined manner. The exact manner of parity generation is independent from the description of the current invention. For example, suppose there are three data disks, the first stripe of the first data disk stores a "1," the first stripe of the second data disk stores a "1," and the first stripe of the third data disk stores a "0." Then the parity bit of the first stripe of the parity disk is the result of 1 XOR 1 XOR 0, which is 0. Since the XOR operation is a memory intensive operation, the storage servers 210 may offload the XOR operation to the ROE 220 in order to save bandwidth of the storage servers 210 for other operations, such as determining when to commit an I/O operation to or from the storage devices 230. The implementation described above may be a RAID-4 scheme. Alternatively, the RAID implementation can distribute the parity bits over the same storage devices as the data, as in a RAID-5 scheme.

Furthermore, each of the storage servers 210 accesses the storage devices 230 via the offload engine 220. Thus, the storage servers 210 may interface with multiple ROEs in order to address additional storage devices than the storage servers 210 could have addressed through direct coupling to the storage devices. An exemplary embodiment of the system in FIG. 2B further illustrates this concept.

Figure 2B:
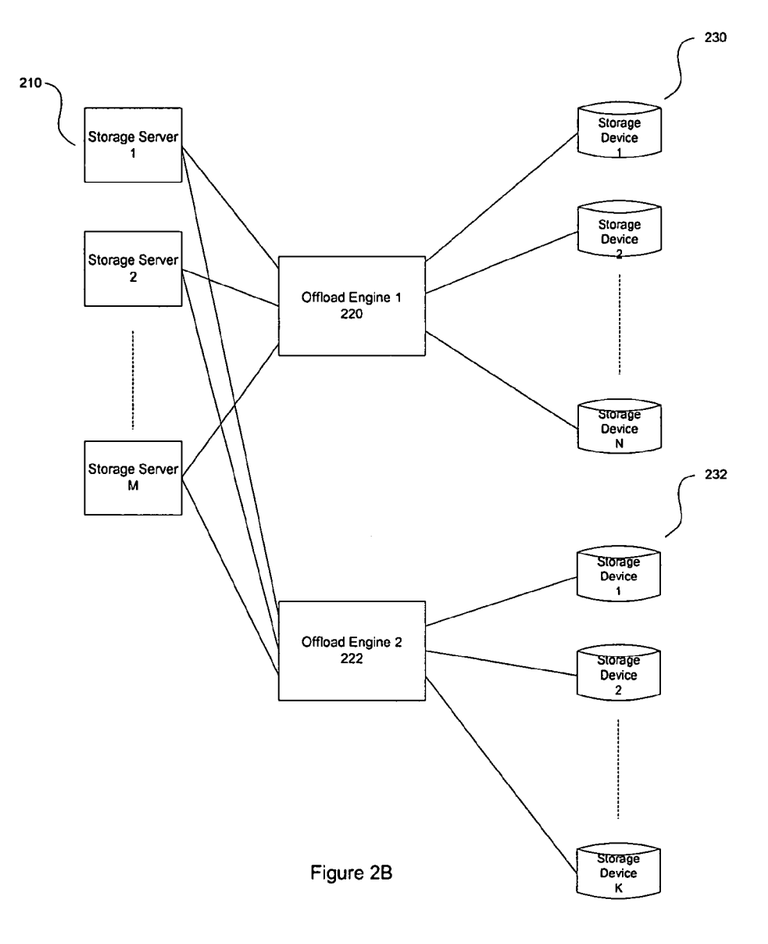
FIG. 2B illustrates an alternate embodiment of a networked storage system.

Referring to FIG. 2B, the system includes a number of storage servers 210, a first offload engine 220, a second offload engine 222, and two sets of storage devices 230 and 232. Each of the storage servers 210 is coupled to both the first and second offload engines 220 and 222. The first offload engine 220 is coupled to the first set of storage devices 230. Likewise, the second offload engine 222 is coupled to the second set of storage devices 232. Through the first and second ROEs 220 and 222, each of the storage servers 210 may access the first and second sets of storage devices 230 and 232, respectively. Furthermore, the storage servers 210 may offload the corresponding RAID operations to each of the offload engines 220 and 222 for accessing the storage devices 230 and 232, respectively. The storage servers 210 may be further coupled to additional offload engines to access additional sets of storage devices. The use of the offload engines 220 and 222, therefore, provides a basis for scalability of the system.

Figure 3:
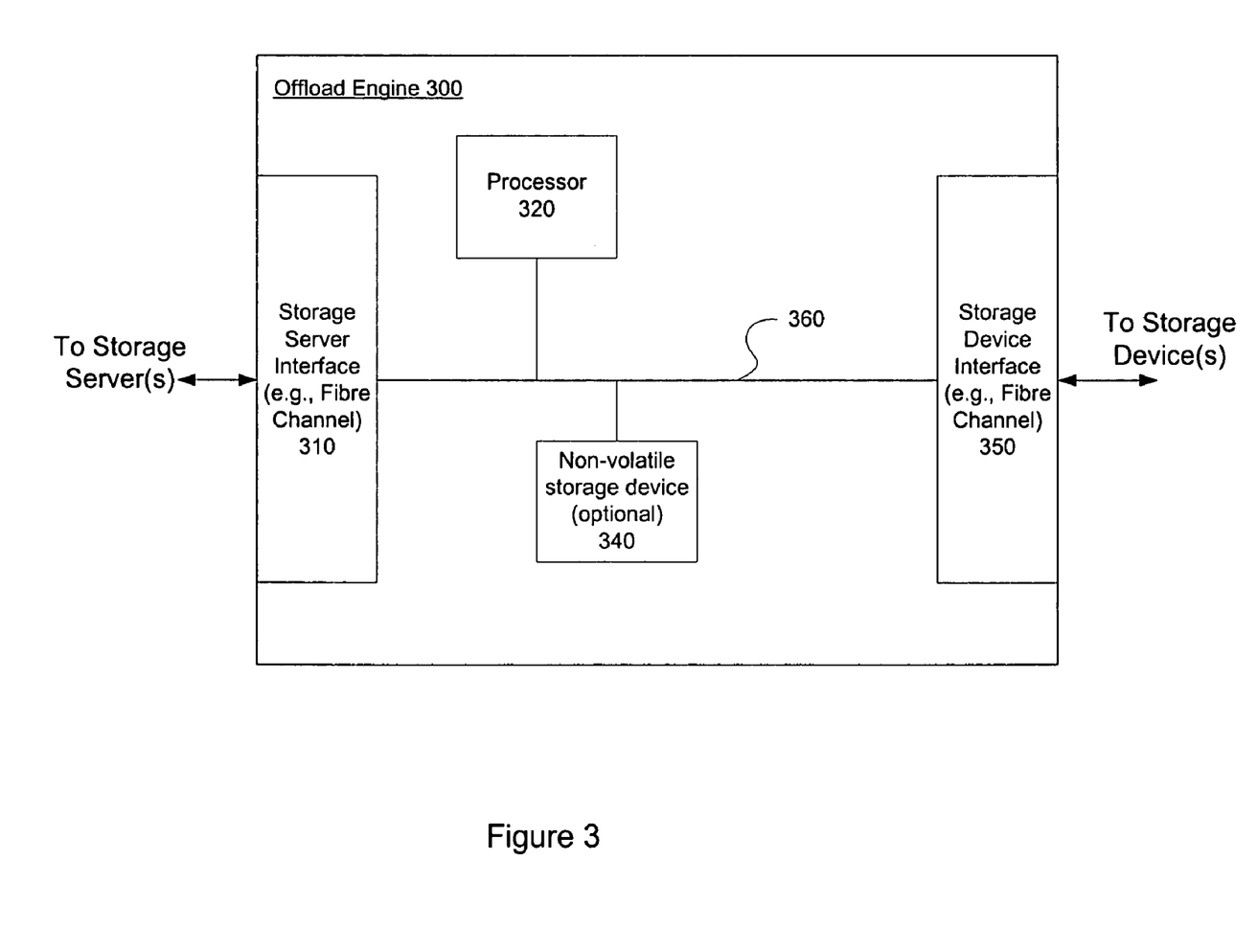
FIG. 3 illustrates one embodiment of an offload engine.

FIG. 3 shows one embodiment of an offload engine. The offload engine 300 includes a storage server interface 310, a processor 320, a bus 360, and a storage device interface 350. The storage server interface 310, the processor 320, and the storage device interface 350 are coupled to each other via the bus 360. The storage server interface 310 couples the offload engine 300 to a number of storage servers (e.g., file servers) in a networked storage system. Likewise, the storage device interface 350 couples the offload engine 300 to a number of storage devices, such as disks. The disks may be organized into a number of RAID volumes.

In one embodiment, the offload engine 300 receives from the storage servers specific commands different from the generic read or write commands in a RAID system. These specific commands guide the offload engine 300 through coherent and correct updates to and retrievals from the RAID volumes. The configurations of the RAID volumes may be directly and completely understood by the storage servers. Furthermore, the offload engine 300 may have no discrete understanding of the RAID configurations. Instead, the storage servers inform the offload engine 300 of the construction and definition of the RAID volumes. In contrast, the convention RAID controllers understand the RAID configurations, but do not present the RAID configurations to the storage servers.

Alternatively, the offload engine 300 may further include the non-volatile storage device 340 (e.g., a non-volatile RAM) coupled to the bus 360 to store the states. Storing the states in the non-volatile storage device 340 enables the offload engine 300 to support consistency across operations. Furthermore, the non-volatile storage device 340 may store a storage system log, which can be used to recover the offload engine after a system failure. In one embodiment, the storage system log records the states of various components in the networked storage system (e.g., storage servers) and/or the states of the ongoing or pending operations. In case of a system failure, information on these states can be retrieved from the storage system log and used to restore the states of the affected components and/or to resume the affected operations. However, one should appreciate that some embodiments of the offload engine 300 may not include a non-volatile storage device, and thus, the storage server controls the transactions and may restart transactions in such a manner that data and parity integrity is maintained.

FIG. 4 illustrates one embodiment of a storage server in a networked storage system. The storage server 400 includes a processor 422, a memory 424, a network adaptor 426, and a storage adaptor 428, which are coupled to each other via a bus 430. In one embodiment, the storage server 400 is within a network and the network adaptor 426 interfaces with the network. The network may include a LAN, a WAN, etc. Data is transmitted between the storage server 400 and the network via the network adaptor 426. When data is received, the network adaptor 426 may forward the data to the storage adaptor 428, the memory 424, and/or the processor 422.

In one embodiment, the processor 422 reads instructions from the memory 424 and executes the instructions. The memory 424 may include any of various types of memory devices, such as, for example, RAM, ROM, flash memory, one or more mass storage devices (e.g., disks), etc. In one embodiment, the memory 424 stores instructions of an operating system 430. The processor 422 may retrieve the instruction from the memory 424 to run the operating system. The processor 422 responds to requests from client machines or other storage servers and organizes data on storage devices in the system. The storage devices are coupled to the storage server 400 via one or more offload engines (not shown). The storage server 400 interfaces with the offload engine(s) via the storage adaptor 428.

As discussed above, the storage server 400 directly and completely understand the configurations of the RAID volumes in some embodiments. Therefore, the storage server 400 may direct the action of the offload engine(s) and may maintain the state and control about the progress of parity and checksum generation. Furthermore, the storage server 400 may configure the offload engine(s) and assign each of the storage devices coupled to the offload engines to be a spare or a data storage device. In one embodiment, the storage server 400 sends commands to the offload engines to cause the offload engines to perform RAID operations. Many RAID operations (e.g., parity calculation) are memory-intensive, the RAID operations consume a large amount of computational resources. Thus, by offloading the RAID operations to the offload engines, the storage server 400 is relieved of some of these memory-intensive tasks. However, the storage server 400 may remain responsible for determining when to perform the RAID operations. In sum, unlike the conventional RAID controller that performs all RAID operations, the storage server 400 may offload some RAID operations to an offload engine.

Figure 5:
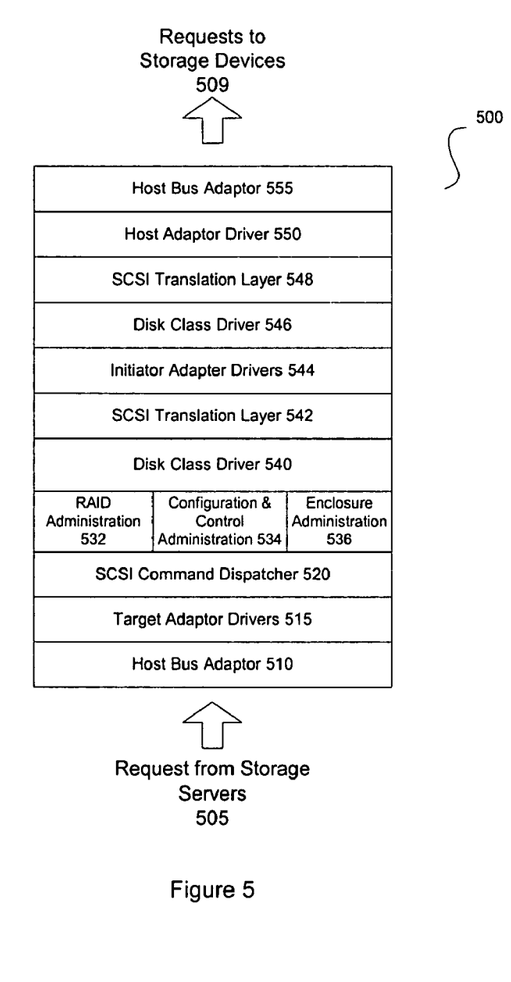
FIG. 5 illustrates a logical representation of one embodiment of a RAID Offload Engine (ROE)

FIG. 5 illustrates a logical representation of one embodiment of an offload engine usable in a networked storage system. The offload engine 500 serves as an intermediary between a number of storage servers and a number of storage devices. The storage devices may include RAID volumes. Therefore, the offload engine 500 is also referred to as a RAID Offload Engine (ROE). However, it should be appreciated that the concept described below is applicable to other embodiments of an offload engine that are coupled to storage devices in other (e.g., non-RAID) arrangement or configuration that supports redundancy.

The ROE 500 includes a host bus adaptor 510 to couple to storage servers, a number of target adaptor drivers 515, a Small Computer System Interface (SCSI) Command Dispatcher 520, a RAID Administrator 532, a Configuration and Control Administrator 534, an Enclosure Administrator 536, a disk class driver 540, a number of Initiator Adaptor Drivers 544, a Disk Class Driver 546, a SCSI translation layer 548, a host adaptor driver 550, and another host bus adaptor 555 to couple to storage devices. The ROE 500 receives requests 505 from the storage servers in networked storage system. In response to the requests 505, the ROE 500 may perform RAID operations and/or send requests 509 to the storage devices (e.g., disks) in the system. The RAID Administrator 532, the Configuration and Control Administrator 534, and the Enclosure Administrator 536 are collectively referred to as the Upper Level Administrators (ULAs).

In one embodiment, the host bus adaptor 510 and the target adaptor drivers 515 are referred to as the link layer. The link layer controls the transport of data and status back to the storage servers. The host bus coupled to the host bus adaptor 510 may be a Fibre Channel interconnect, or some may implement another storage protocol intended for the transport of commands and data between the ROE 500 and a set of storage peripherals.

The other component of the link layer, the target adaptor drivers 515 may be a single instance, but can be constructed to handle multiple host bus adaptors of a common kind. In one embodiment, there is one target driver for each type of host bus adaptors (e.g., Fibre Channel adaptor). The target adaptor drivers 515 may also handle task management to ensure coherency of I/O operations. In response to a request to abort an operation, the target adaptor drivers 515 may reset some targets or logical units and exercise some predetermined link controls. In addition, the target adaptor drivers 515 may handle transport functions. When a command is received, the target adaptor drivers 515 send the command from the host bus adaptor 510 to the SCSI command dispatcher 520.

Above the target adaptor drivers 515 is the SCSI Command Dispatcher 520, which is a distribution point for transactions between the storage servers and the storage devices coupled to the ROE 500. The SCSI Command Dispatcher 520 parses the commands from the storage servers to determine where to route the commands. The SCSI Command Dispatcher 520 may have the ULAs logged in with the SCSI Command Dispatcher 520 and informs the ULAs on which logical unit(s) the ULAs will manage. The ULAs and the SCSI Command Dispatcher 520 may have a predetermined interface to direct operations, such as a table driver or message passing scheme. Based on identification numbers of the logical units, the SCSI Command Dispatcher 520 may send commands to the proper logical units. In addition, the SCSI Command Dispatcher 520 may map the Fibre Channel port exchanges or iSCSI messages to internal tasks of the ROE 500. An exchange or a message may be identified uniquely at the target adaptor driver 515 and the SCSI command dispatcher 520 may allocate some handle for the exchange or message in a unique manner in order to direct transactions back to the proper host bus adaptor 510.

Above the SCSI Command Dispatcher 520 are the ULAs 532–536. The RAID Administrator 532, also known as the RAID execution engine, handles the operations related to the implementation of RAID functions and/or other SCSI operations. The RAID operations may include checksum determination and parity calculation. The RAID administrator 532 may also handle the I/O operations to or from the storage devices.

One of the ULAs is the Configuration and Control Administrator (CCA) 534. The CCA 534 defines the configuration of the storage devices (e.g., disks) coupled to the ROE 500. The CCA 534 may perform instantiation of RAID groups, incorporation of spare disks, etc.

The third ULA is the Enclosure Administrator (EA) 536, which is also referred to as the enclosure clearing-house. The storage devices coupled to the ROE 500 may include disks organized into shelves. Each shelf may include an enclosure server. The EA 536 communicates with the enclosure servers and forwards the enclosure events for the shelves to the storage server(s).

Above the ULAs, the ROE 500 has a storage stack to abstract the interfaces to the storage devices. The storage stack may include the disk class driver 540, the Initiator Adaptor Drivers 544, the Disk Class Driver 546, the SCSI translation layer 548, the host adaptor driver 550, and another host bus adaptor 555 to couple to storage devices.

One should appreciate that the layers 510–555 of the ROE 500 may or may not be implemented as separate tasks. Furthermore, these layers may include direct callable layers, table indirect driven callable interface, and/or separate tasks communicating by signals or messages.

Figure 6:
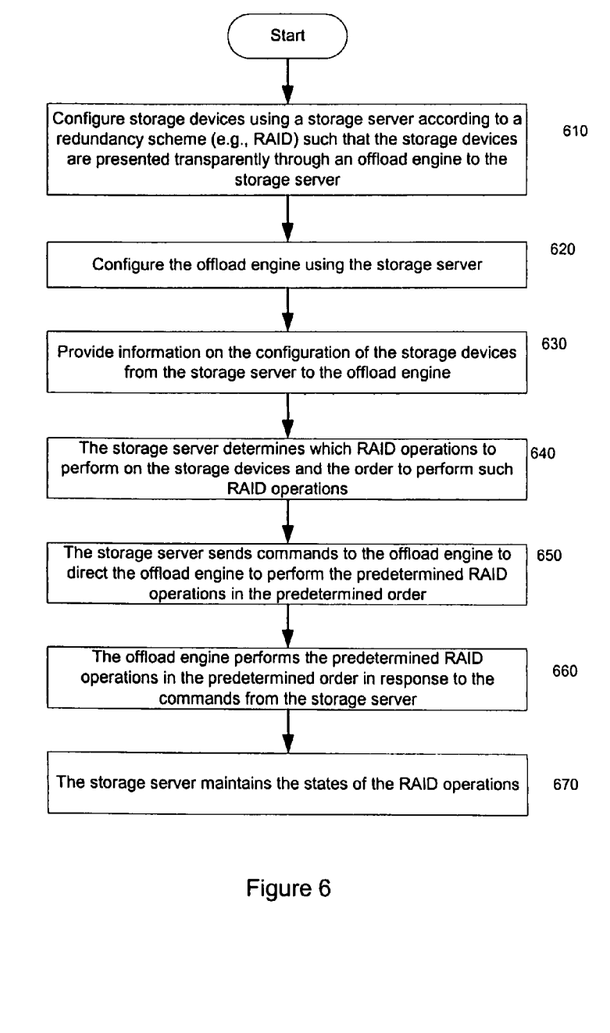
FIG. 6 is a flow diagram of one embodiment of a process for offloading operations from a storage server to an offload engine.

FIG. 6 illustrates one embodiment of a process to offload operations from a storage server to an offload engine. The process is performed by processing logic that may comprise hardware (e.g., circuitry, dedicated logic, etc.), software (such as is run on a general-purpose computer system or a dedicated machine, such as the ROE), or a combination of both.

Processing logic configures a number of storage devices using a storage server according to a redundancy scheme (e.g., RAID) such that the storage devices are presented transparently through an offload engine to the storage server (processing block 610). For example, the storage server may designate each of the storage devices as a spare storage device, a data storage device, or a parity storage device, etc. Furthermore, the storage devices may include disks and the storage server may include a file server. Processing logic also configures the offload engine using the storage server (processing block 620). Processing logic provides the information on the configuration of the storage devices from the storage server to the offload engine (processing block 630).

At processing block 640, the storage server determines which operations to perform on the storage devices and the order to perform such operations. The operations may include RAID operations, such as parity and checksum generation. Then the storage server sends commands to the offload engine to direct the offload engine to perform the predetermined RAID operations in the predetermined order at processing block 650. In one embodiment, the commands are specific commands that guide the offload engine through coherent and correct updates to and retrievals from the storage devices. At processing block 660, the offload engine performs the predetermined RAID operations in the predetermined order in response to the commands from the storage server.

At processing block 670, the storage server maintains the states of the RAID operations. By maintaining the states of the RAID operations, the storage server may retain control of the RAID operations while the offload engine remains stateless. The offload engine may have no discrete understanding of the configuration of the storage devices, except the construction and definition of the storage devices as provided by the storage server. Thus, instead of providing another layer of abstraction between the storage devices and the storage server, the offload engine presents the storage devices to the storage server as the storage devices are constructed. In other words, the storage devices may be made individually visible, or presented transparently, to the storage server via the offload engine. Since the offload engine presents the storage devices transparently to the storage server, the storage server may determine which storage device the offload engine is accessing, where in the storage device the data is accessed, and when to perform the RAID operations. Alternatively, the offload engine may include a non-volatile memory device to store the states of the RAID operations in order to support consistency across operations as discussed above.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
configuring a plurality of storage devices in a networked storage system according to a redundancy scheme using a storage server in the networked storage system;
providing information on a configuration of the plurality of storage devices from the storage server to an offload engine coupled to the storage server; and
the storage server directing the offload engine to perform a plurality of RAID operations on the plurality of storage devices, wherein the plurality of storage devices are presented transparently to the storage server via the offload engine, wherein the offload engine remains stateless.

2. The method of claim 1, further comprising maintaining a plurality of states of the plurality of operations in the storage server.

3. The method of claim 2, further comprising configuring the offload engine using the storage server.

4. The method of claim 1, wherein the plurality of operations comprise parity and checksum generation.

5. The method of claim 1, wherein the redundancy scheme is an implementation of Redundant Array of Independent Disks (RAID).

6. The method of claim 1, wherein the storage server directing the offload engine to perform the plurality of RAID operations comprises sending a plurality of commands from the storage server to the offload engine.

7. The method of claim 6, wherein the offload engine performs the plurality of RAID operations in response to an order of the plurality of commands arriving at the offload engine.

8. A processing system comprising:
a processor; and
a storage medium that stores instructions which, if executed by the processor, will cause the processing system to perform a plurality of operations comprising:
configuring a plurality of storage devices into a RAID group using a storage server;
determining, using the storage server, an order in which a plurality of RAID operations are to be performed;
directing an offload engine, coupled to the storage server, to perform the plurality of RAID operations in the order determined by the storage server;
configuring the offload engine using the storage server; and
maintaining a plurality of states of the plurality of RAID operations in the storage server such that the offload engine remains stateless.

9. The processing system of claim 8, wherein the plurality of RAID operations comprise parity and checksum generation.

10. The processing system of claim 8, wherein the storage server comprises a file server.

11. A system comprising:
a plurality of storage devices configured according to a redundancy scheme;
an offload engine coupled to the plurality of storage devices; and
a storage server, coupled to the plurality of storage devices via the offload engine, to direct the offload engine to perform a plurality of RAID operations on the plurality of storage devices, wherein the plurality of storage devices are presented transparently to the storage server via the offload device, wherein the storage server comprises a memory device to maintain a plurality of states of the plurality of operations such that the offload engine remains stateless.

12. The system of claim 11, wherein the storage server configures the plurality of storage devices.

13. The system of claim 12, wherein the plurality of storage devices are configured into a RAID group.

14. The system of claim 11, wherein the storage server sends a plurality of commands to the offload engine to cause the offload engine to perform the plurality of RAID operations in an order predetermined by the storage server.

15. The system of claim 11, wherein the plurality of RAID operations comprise parity and checksum generation.

16. A method comprising:
configuring a plurality of storage devices in a networked storage system into at least one RAID group using a storage server in the networked storage system, wherein the at least one RAID group is presented transparently to the storage server via an offload engine;
configuring the offload engine using the storage server;
providing information on a configuration of the at least one RAID group from the storage server to the offload engine;
the storage server determining an order to perform a plurality of RAID operations on the at least one RAID group, the plurality of RAID operations including parity and checksum generation;
the storage server sending a plurality of commands in the order determined to the offload engine to direct the offload engine to perform the plurality of RAID operations on the at least one RAID group; and
the offload engine performing the plurality of RAID operations in the order determined by the storage server in response to the plurality of commands, wherein the offload engine remains stateless.

17. A method comprising:
means for configuring a plurality of storage devices in a networked storage system according to a redundancy scheme using a storage server in the networked storage system;
means for providing a configuration of the plurality of storage devices from the storage server to an offload engine coupled to the storage server; and
means for directing the offload engine to perform a plurality of RAID operations on the plurality of storage devices using the storage server, wherein the plurality of storage devices are presented transparently to the storage server via the offload devices, wherein the offload device remains stateless.

* * * * *